(12) United States Patent
Desai

(10) Patent No.: US 9,241,131 B2
(45) Date of Patent: Jan. 19, 2016

(54) MULTIPLE CHANNEL COMMUNICATION USING MULTIPLE CAMERAS

(71) Applicant: SAMSUNG ELECTRONICS CO., LTD., Suwon, Gyeonggi-Do (KR)

(72) Inventor: Prashant Desai, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 13/906,259

(22) Filed: May 30, 2013

(65) Prior Publication Data
US 2013/0328997 A1 Dec. 12, 2013

Related U.S. Application Data

(60) Provisional application No. 61/657,653, filed on Jun. 8, 2012, provisional application No. 61/780,725, filed on Mar. 13, 2013.

(51) Int. Cl.
H04N 7/15 (2006.01)
H04N 7/14 (2006.01)
H04N 21/214 (2011.01)
H04N 21/218 (2011.01)
H04N 21/41 (2011.01)

(52) U.S. Cl.
CPC ............... *H04N 7/15* (2013.01); *H04N 7/141* (2013.01); *H04N 21/2143* (2013.01); *H04N 21/21805* (2013.01); *H04N 21/4126* (2013.01)

(58) Field of Classification Search
CPC ..... H04N 7/142; H04N 7/15; H04N 21/4125; H04N 21/21905; H04N 21/2143
USPC .......................................... 348/14.01–14.16
See application file for complete search history.

(56) References Cited

U.S. PATENT DOCUMENTS

| | | | |
|---|---|---|---|
| 7,444,664 B2 | 10/2008 | Lou et al. | |
| 7,492,386 B2 * | 2/2009 | Nichols et al. | ............. 348/14.07 |
| 7,583,316 B2 | 9/2009 | Miyashita et al. | |
| 8,451,312 B2 | 5/2013 | Lee et al. | |
| 8,744,420 B2 | 6/2014 | Cranfill et al. | |
| 2002/0164567 A1 | 11/2002 | Katayama | |
| 2003/0026611 A1 | 2/2003 | Cho | |
| 2004/0189851 A1 | 9/2004 | Son et al. | |
| 2004/0208493 A1 | 10/2004 | Kashiwa et al. | |

(Continued)

FOREIGN PATENT DOCUMENTS

| | | | |
|---|---|---|---|
| EP | 1560421 A1 | 8/2005 | |
| EP | 1441522 B1 | 4/2006 | |

(Continued)

OTHER PUBLICATIONS

European Search Report mailed Aug. 16, 2013 for European Application No. 13171018.8 from European Patent Office, pp. 1-8, Berlin, Germany.

(Continued)

*Primary Examiner* — Melur Ramakrishnaiah
(74) *Attorney, Agent, or Firm* — Sherman IP LLP; Kenneth L. Sherman; Steven Laut

(57) ABSTRACT

A method for video image sharing and control comprises activating video communication between electronic devices. Transmission of multiple video feeds is controlled using multiple cameras from a first electronic device.

32 Claims, 12 Drawing Sheets

(56) References Cited

U.S. PATENT DOCUMENTS

| | | | |
|---|---|---|---|
| 2005/0140812 | A1 | 6/2005 | Yoo et al. |
| 2006/0139463 | A1 | 6/2006 | Heinonen |
| 2007/0263079 | A1 | 11/2007 | Graham et al. |
| 2007/0279482 | A1 | 12/2007 | Oswald |
| 2008/0034278 | A1 | 2/2008 | Tsou |
| 2009/0202223 | A1 | 8/2009 | Saito |
| 2009/0232129 | A1* | 9/2009 | Wong et al. ............ 370/352 |
| 2010/0053212 | A1 | 3/2010 | Kang et al. |
| 2010/0157016 | A1 | 6/2010 | Sylvain |
| 2011/0090347 | A1 | 4/2011 | Buckner et al. |
| 2011/0249086 | A1* | 10/2011 | Guo et al. ............ 348/14.12 |
| 2012/0008011 | A1 | 1/2012 | Garcia Manchado |
| 2012/0191223 | A1* | 7/2012 | Dharwada et al. ........... 700/17 |
| 2012/0274808 | A1* | 11/2012 | Chong et al. ............ 348/234 |
| 2013/0286250 | A1 | 10/2013 | Kumar et al. |
| 2013/0329100 | A1 | 12/2013 | Desai et al. |

FOREIGN PATENT DOCUMENTS

| | | |
|---|---|---|
| JP | 2003298884 A | 10/2003 |
| JP | 2004180107 A | 6/2004 |
| KR | 100533450 B1 | 2/2006 |
| KR | 1020060021680 A | 3/2006 |
| KR | 1020110129744 A | 12/2011 |
| KR | 1020120048293 A | 5/2012 |
| WO | 2006067545 A1 | 6/2006 |

OTHER PUBLICATIONS

ITUT-T Telecommunication Standarization Secotr of ITU, Role management and additional media channels for H.300-series Terminals, H.239, Sep. 13, 2005, International Telecommunication Union, pp. 1-32, Geneva.

International Search Report and Written Opinion mailed Oct. 22, 2013 for International Application No. PCT/KR2013/005054 from Korean Intellectual Property Office, pp. 1-11.

International Search Report and Written Opinion dated Oct. 21, 2013 for International Application No. PCT/KR2013/004944 from Korean Intellectual Property Office, pp. 1-11, Seo-gu, Daejon, Republic of Korea.

Extended European Search Report dated Aug. 21, 2014 for European Application No. 13170796.0 from European Patent Office, pp. 1-9, Munich, Germany.

U.S. Non-Final Office Action for U.S. Appl. No. 13/803,885 mailed Apr. 24, 2014.

U.S. Final Office Action for U.S. Appl. No. 13/803,885 mailed Oct. 30, 2014.

U.S. Advisory Action for U.S. Appl. No. 13/803,885 mailed Jan. 26, 2015.

U.S. Non-Final Office Action for U.S. Appl. No. 13/803,885 mailed Apr. 8, 2015.

U.S. Final Office Action for U.S. Appl. No. 13/803,885 mailed Oct. 22, 2015.

* cited by examiner

MULTIPLE CHANNEL COMMUNICATION USING MULTIPLE CAMERAS

CROSS-REFERENCE TO RELATED APPLICATIONS

This application claims the priority benefit of U.S. Provisional Patent Application Ser. No. 61/657,653, filed Jun. 8, 2012, and U.S. Provisional Patent Application Ser. No. 61/780,725, filed Mar. 13, 2013, incorporated herein by reference in its entirety.

TECHNICAL FIELD

One or more embodiments relate generally to multiple channel communication and, in particular, to multiple channel communication using multiple cameras.

BACKGROUND

With the rapid proliferation of mobile communication devices such as smartphones amongst users such as teenagers and children, there is an increase in use of integrated cameras via such devices.

SUMMARY

In one embodiment, a method provides video image sharing and control. One embodiment comprises a method that comprises activating video communication between electronic devices. In one embodiment, transmission of a plurality of video feeds is controlled using a plurality of cameras from a first electronic device.

One embodiment provides a system for video image sharing and control. In one embodiment, the system comprises a first electronic device. In one embodiment, a first camera is used for capturing a first video feed. In one embodiment, a second camera is used for capturing a second video feed. In one embodiment, the first electronic device controls transmission of the first video feed and the second video feed to a second electronic device.

Another embodiment provides a non-transitory computer-readable medium having instructions which when executed on a computer perform a method comprising: activating video communication between electronic devices. In one embodiment, transmission of a plurality of video feeds using a plurality of cameras is controlled from a first electronic device.

One embodiment provides a graphical user interface (GUI) displayed on a display of an electronic device. In one embodiment, the GUI comprises: a first image of a first video feed captured from a first camera and a second image of a second video feed captured from a second camera. In one embodiment, the first video feed and the second video feed are simultaneously transmitted from another electronic device.

One embodiment comprises a system including a server that provides a service for video content streaming for communicating, sharing and control of video content. In one embodiment, a first electronic device captures a first video feed and a second video feed for sharing the first video feed and the second video feed with a second electronic device using the service provided by the server.

One embodiment comprises a server including a memory for storing video feeds. In one embodiment, a service uses a processor for video content streaming for communicating, sharing and control of the video feeds with electronic devices that each capture a first video feed and a second video feed for sharing the first video feed and the second video feed with another electronic device using the service.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
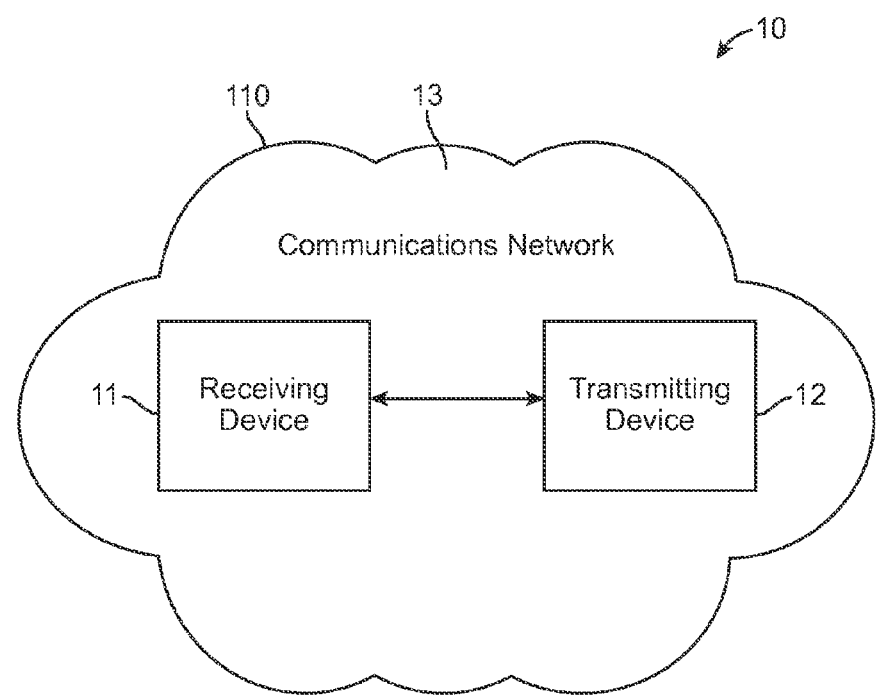
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to video image sharing and control. In one embodiment, the electronic device comprises a mobile electronic device capable of data communication over a communication link such as a wireless communication link. Examples of such mobile device include a mobile phone device, a mobile tablet device, etc.

In one embodiment, a method provides video image sharing and control. One embodiment comprises a method that comprises activating video communication between electronic devices. In one embodiment, transmission of a plurality of video feeds using a plurality of cameras is controlled from a first electronic device.

One or more embodiments enable a user to activate a video communication session (e.g., a video chat communication) using multiple cameras (e.g., a front and rear camera of an electronic device) and use the captured video feeds from the multiple cameras to transmit video images to another electronic device. In one embodiment, the transmitting electronic device may control the video feeds from each camera to another electronic device by turning on/off sharing of the video feed from either camera. In one embodiment, the receiving electronic device may choose either the first feed or the second feed to be displayed in full-screen mode or in a smaller view frame (e.g., a small window or thumbnail video frame, etc.). In one embodiment, the second electronic device may similarly send first and second video feeds from a front and rear camera to the first electronic device. In one embodiment, the second electronic device may control the video feeds from each camera to another electronic device by turning on/off sharing of the video feed from either camera. In one embodiment, each electronic device may also view the video feeds from their own respective cameras on a display in a small window or thumbnail view.

In one embodiment, using multiple cameras (e.g., front and rear cameras) for communication of video from an electronic device provides the user of a receiving electronic device multiple views from the sending user's electronic device. In one embodiment, the multiple views may comprise the sender's face if the sender is holding the electronic device in front of him/her with the first camera facing him/her, and a view of what the sender is viewing from the rear camera of the electronic device (e.g., what the sending user sees with the rear camera facing away from him/her).

In one embodiment, a sending user may select to send both video feeds from each of the multiple cameras or only one of the video feeds from one of the cameras by pressing on a touch screen of a display over a view of the transmitted video feed on the display of the sending user's electronic device. In one embodiment, the receiving user may select to view either video feed in full-screen mode on their electronic device or thumbnail viewing on their electronic device and may switch between view sizes for each received video feed. In one embodiment, the sending and receiving of multiple video feeds to/from each electronic device is simultaneous (e.g., each captured video image from each camera of each electronic device is transmitted/received).

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
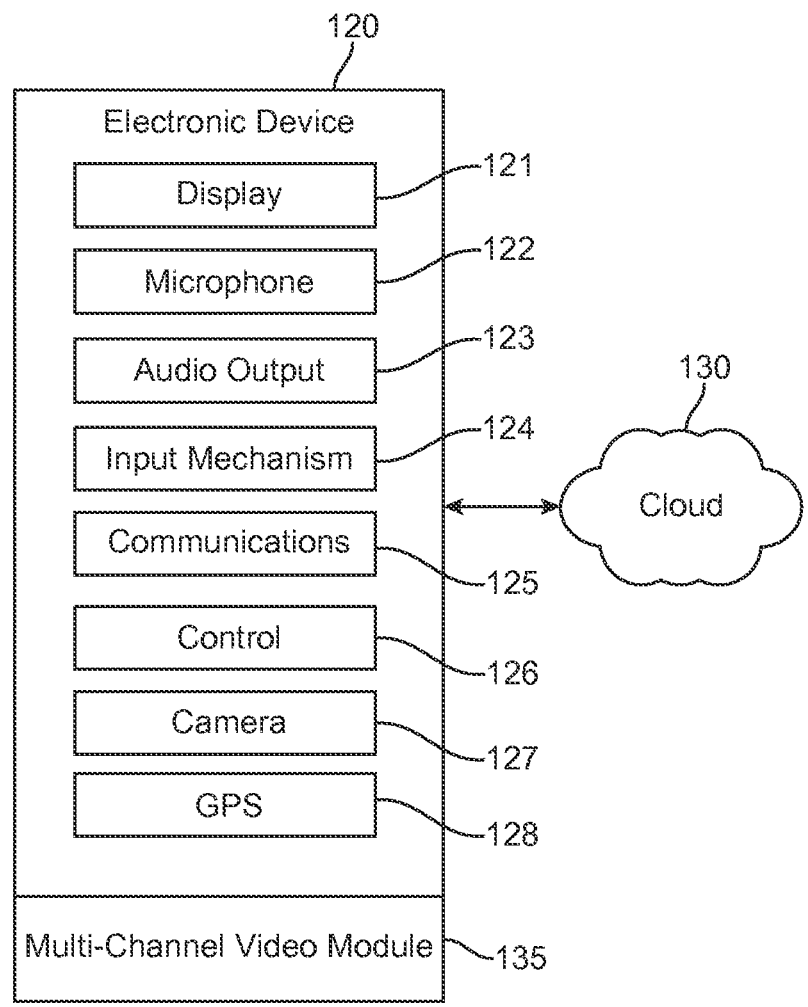
FIG. 2 shows a block diagram of an architecture system for video image sharing and control for an electronic device, according to an embodiment.

FIG. 2 shows a functional block diagram of an electronic device 120, according to an embodiment. Both transmitting device 12 and receiving device 11 may include some or all of the features of electronics device 120. In one embodiment, the electronic device 120 may comprise a display 121, a microphone 122, audio output 123, input mechanism 124, communications circuitry 125, control circuitry 126, a camera module 127, a global positioning system (GPS) receiver module 128, a multi-channel video module 135, and any other suitable components.

In one embodiment, all of the applications employed by audio output 123, display 121, input mechanism 124, communications circuitry 125, and microphone 122 may be interconnected and managed by control circuitry 126. In one example, a handheld music player capable of transmitting music to other tuning devices may be incorporated into the electronics device 120.

In one embodiment, audio output 123 may include any suitable audio component for providing audio to the user of electronics device 120. For example, audio output 123 may include one or more speakers (e.g., mono or stereo speakers) built into electronics device 120. In some embodiments, audio output 123 may include an audio component that is remotely coupled to electronics device 120. For example, audio output 123 may include a headset, headphones, or earbuds that may be coupled to communications device with a wire (e.g., coupled to electronics device 120 with a jack) or wirelessly (e.g., a paired Bluetooth® headphones or a Bluetooth® headset).

In one embodiment, display 121 may include any suitable screen or projection system for providing a display visible to the user. For example, display 121 may include a screen (e.g., an LCD screen) that is incorporated in electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen incorporated with the display 121. The input mechanism 124 may include a multi-touch screen. The input mechanism may include a user interface that may emulate a rotary phone or a multi-button keypad, which may be implemented on a touch screen or the combination of a click wheel or other user input device and a screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a camera application including a gallery application and an editing application, a calendar application, a contact list application, a map application, a media application (e.g., QuickTime, MobileMusic.app, or MobileVideo.app), etc. In some embodiments, the electronics device 120 may include one or several applications operative to perform communications operations. For example, the electronics device 120 may include a messaging application, a mail application, a telephone application, a voicemail application, an instant messaging application (e.g., for chatting), a videoconferencing application, a fax application, or any other suitable application for performing any suitable communications operation.

Figure 3:
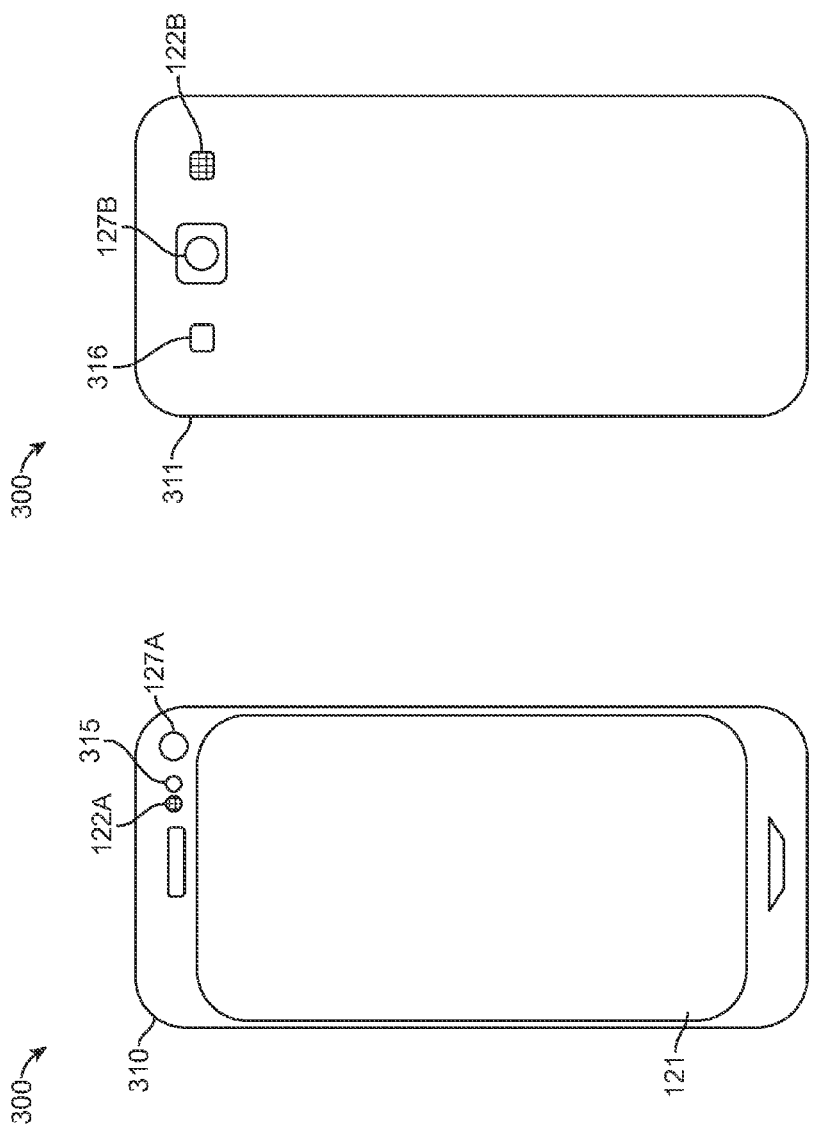
FIGS. 3A-B show example views of a front and back of an electronic device for video image sharing and control, according to an embodiment.

In some embodiments, the electronics device 120 may include one or more microphones 122. For example, electronics device 120 may include microphone 122 to allow the user to transmit audio (e.g., voice audio) during a communications operation or as a means of establishing a communications operation or as an alternate to using a physical user interface. Microphone 122 may be incorporated in electronics device 120 or may be remotely coupled to the electronics device 120. For example, microphone 122 may be incorporated in wired headphones or microphone 122 may be incorporated in a wireless headset. In one embodiment, the electronic device 120 includes a front microphone 122A (FIG. 3A) and a rear microphone 122B (FIG. 3B). In one embodiment, the front and rear microphones 122A, 122B may be used one at a time or simultaneously.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In one embodiment, a user may direct electronics device 120 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, the GPS receiver module 128 may be used to identify a current location of the mobile device (i.e., user). In one embodiment, a compass module is used to identify direction of the mobile device, and an accelerometer and gyroscope module is used to identify tilt of the mobile device. In other embodiments, the electronic device may comprise a stationary electronic device, such as a television or television component system.

In one embodiment, the electronic device may comprise multiple cameras (e.g., a front/facing camera, a rear/opposing camera, etc.) that interoperate with the camera module 127 for providing image capturing settings, editing functionality, image storing, and sharing functionality, etc.

In one embodiment, the multi-channel video module 135 provides interoperability with the camera module 127 and multiple cameras (e.g., front/facing camera, rear/opposing camera, etc.) for communicating with other electronic devices by transmitting and receiving multiple video feeds captured by the multiple cameras in a communication session (e.g., a video chat communication). In one embodiment, the multi-channel video module 135 provides for simultaneous transmission of live-captured video frames from each camera of the electronic device 120 and for simultaneous reception of multiple feeds from live captured video frames from each camera of another electronic device (e.g., another electronic device 120).

In one embodiment, the multi-channel video module 135 provides control of transmission of the captured video feeds from multiple cameras by interacting with a touch screen of the display 121 for turning on or off of sharing the live video feeds from the multiple cameras. In one embodiment, the multi-channel video module 135 provides control for displaying the multiple video feeds on the display 121 by user selection using the touch screen of the display 121 to control whether the video feeds are displayed and the size of the video feed on the display 121.

FIGS. 3A-3B show example views of a body 300 including a rear 310 and front 311 for an electronic device 120 (which may comprise all of the elements and features of the electronic device 120) for video image sharing and control, according to an embodiment. In one embodiment, the rear 310 of the body 300 includes the display 121, a first microphone 122A, a first flash element 315, and a first camera 127A. In one embodiment, the front 311 of the body 300 includes a second microphone 122B, a second flash element 316 and a second camera 127B.

In one embodiment, the first camera 127A and the second camera 127B each provide live capture of video feeds for communication between electronic devices 120. In one embodiment, the first camera 127A (rear facing) and the second camera 127B (front facing) provide simultaneous video feed communication between electronic devices 120, where each camera shows a different view perspective based on their respective positions on the electronic devices 120.

Figure 4:
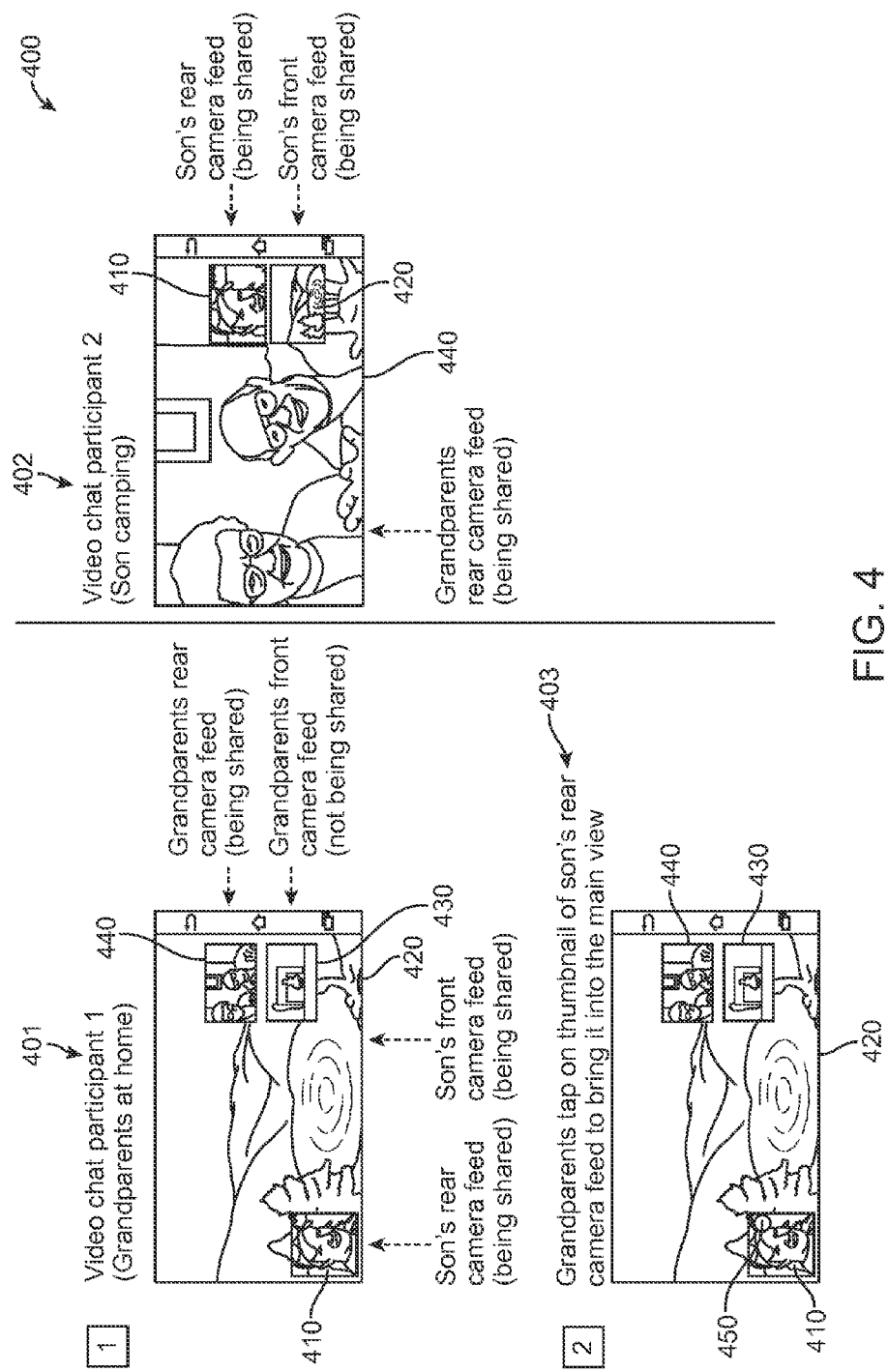
FIG. 4 shows an example scenario of video image sharing and control for an electronic device, according to an embodiment.

FIG. 4 shows an example scenario 400 of video image sharing and control for an electronic device 120, according to an embodiment. In one embodiment, a video communication session (e.g., a multichannel video chat session using multiple cameras from each participant) has been activated between a first participant (e.g., grandparents) and a second participant (e.g., a son). In one embodiment, the first chat view 401 includes a small window video frame 410 that shows a video feed from a rear camera (e.g., facing the second participant) of an electronic device 120 of the second participant shown on the display 121 of the first participant. In one embodiment, the second participant has selected the video feed from the rear camera for sharing with the first participant, and the first participant has selected to view the video frame 410 as a small display (as compared to a larger video frame 420). In one embodiment, the larger video frame 420 shows a video feed from a front camera (e.g., facing away from the second participant) of the electronic device 120 of the second participant shown on the display 121 of the first participant. In one embodiment, the second participant has selected the video feed from the front camera for sharing with the first participant, and the first participant has selected to view the video frame 420 as a full-screen display (as compared to video frame 410).

In one embodiment, the first chat view 401 shows a small video frame 440 showing the first participant's video feed from a rear camera (e.g., facing the first participant) of the electronic device 120 and another small video frame 430 showing the first participant's video feed from a front camera (e.g., facing away from the first participant) of the electronic device 120. In one embodiment, the view from the video frame 440 is currently being shared with the second participant, while the view from the video frame 430 is not being shared with the second participant. In one embodiment, video frames being shared may include a feedback indicating the video feed is being shared, such as a different color border/outline, an indicator (e.g., a symbol), words, etc.

In one embodiment, the second chat view 402 does not include a small window video frame showing a video feed from a front camera (e.g., facing away from the first participant) of an electronic device 120 of the second participant shown on the display 121 of the second participant since the first participant selected not to share this video feed. In one embodiment, the first participant has selected the video feed from the rear camera for sharing with the second participant. In one embodiment, the larger video frame 440 shows a video feed from the rear camera (e.g., facing the first participant) of the electronic device 120 of the first participant shown on the display 121 of the second participant. In one embodiment, the second participant does not have to select a video frame 440 as a full-screen display as it has defaulted due to the first participant not currently sharing both video feeds.

In one embodiment, the second chat view 402 shows a small video frame 410 showing the second participant's video feed from a rear camera (e.g., facing the second participant) of the electronic device 120 and another small video frame 420 showing the second participant's video feed from a front camera (e.g., facing away from the second participant) of the electronic device 120. In one embodiment, the view from the video frames 410 and 420 are currently being shared with the first participant.

In one embodiment, in the third chat view 403, the first participant desires to see the video feed from the rear camera of the second participant (currently shown in video frame 410) in full screen. In one embodiment, the first participant taps 450 on the video frame 410 in order to switch the view frame 420 with the view frame 410 (see chat view 501, FIG. 5).

Figure 5:
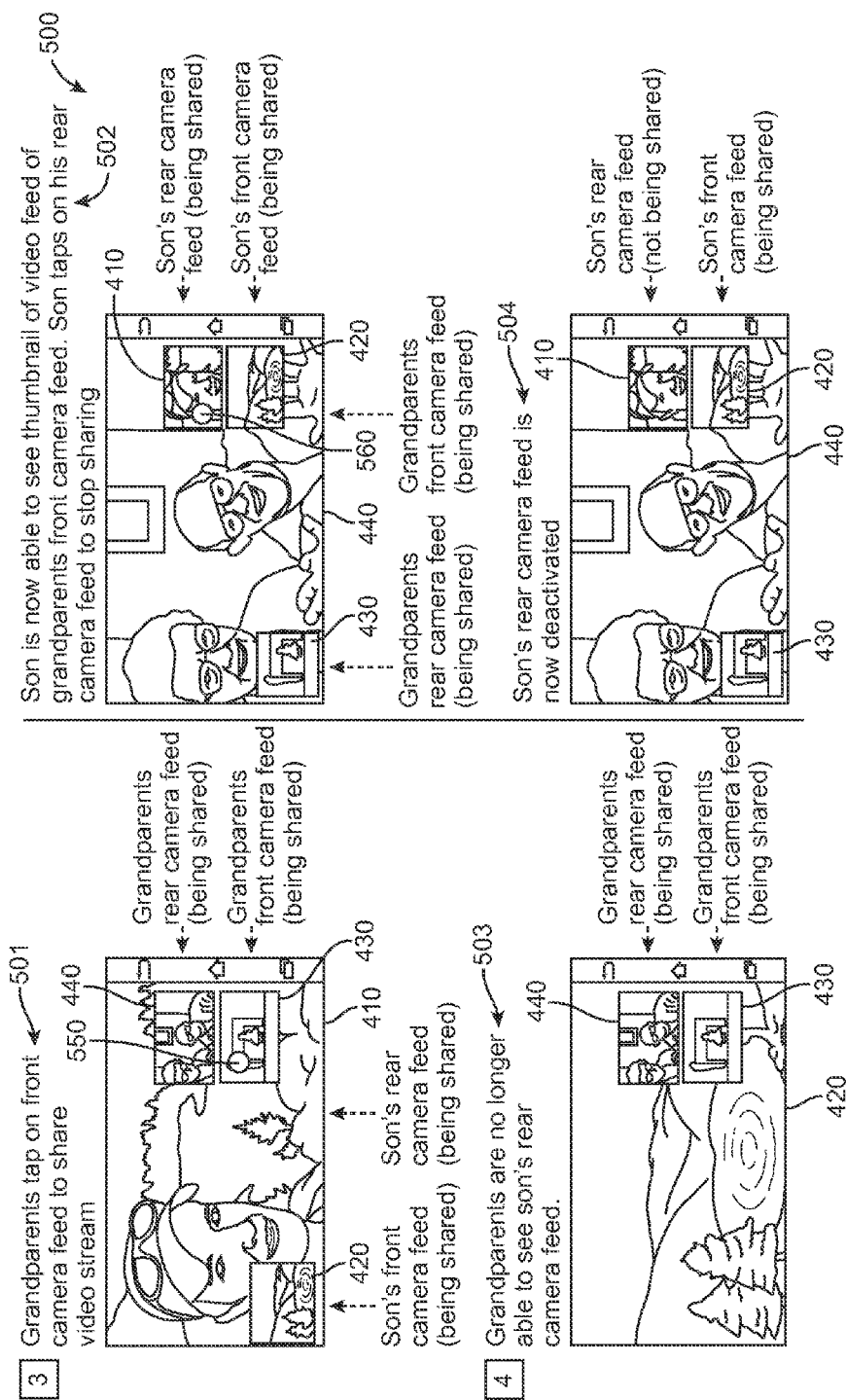
FIG. 5 shows another example scenario for video image sharing and control for an electronic device, according to an embodiment.

FIG. 5 shows another example scenario 500 for video image sharing and control for an electronic device 120, according to an embodiment. In chat view 501, the first participant has selected the rear camera video feed from the second participant to be shown in video frame 410 (full screen) and the video feed from the front camera to be shown in video frame 420 as a small window. In one embodiment, the first participant desires to share the video feed from the front camera with the second participant and taps 550 on a touch screen of the display 121 over the video frame 430.

In one embodiment, in chat view 502, the second participant now has the video frame 430 visible on the display 121 as the first participant is now sharing this video feed from the front camera of their electronic device 120. In one embodiment, the second participant now desires to stop sharing the video feed from the rear camera and taps 560 on a touch screen of the display 121 over the video frame 410.

In one embodiment, in chat view 503, the first participant now cannot see the video frame 410 visible on the display 121 as the second participant has now stopped sharing this video feed from the rear camera of their electronic device 120. In one embodiment, the video feed from the second participant's front camera is shown in video frame 420 as full screen. In one embodiment, in chat view 504, the video feed from the rear camera of the second participant has been selected as not being shared.

Figure 6:
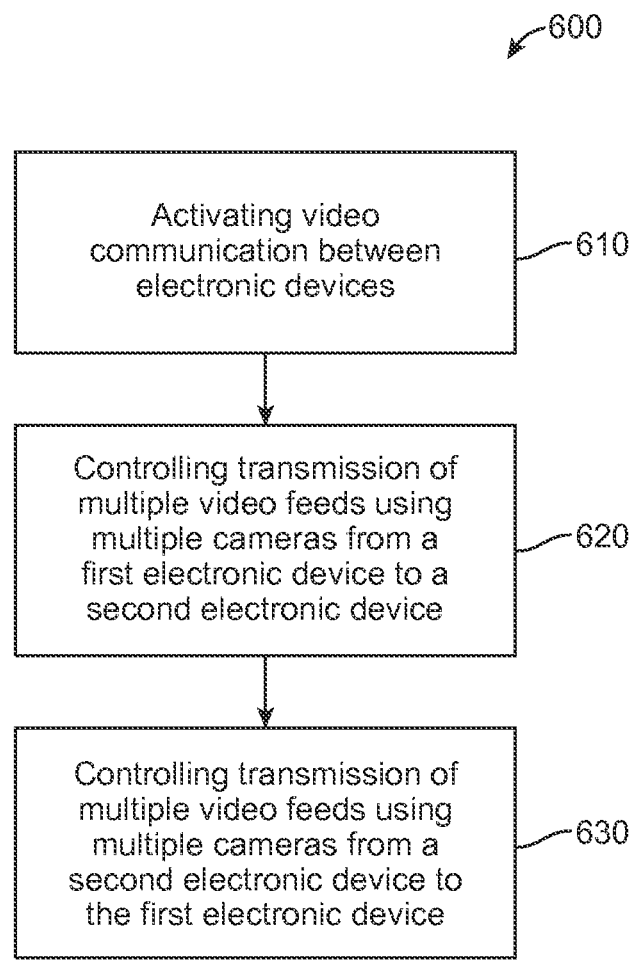
FIG. 6 shows a block diagram of a flowchart for video image sharing and control for an electronic device, according to an embodiment.

FIG. 6 shows a block diagram of a flowchart 600 for video image sharing and control for an electronic device (e.g., electronic device 120), according to an embodiment. In one embodiment, in block 610, video communication (e.g., a video chat session) between electronic devices is activated (e.g., using live video feeds from multiple cameras of an electronic device 120). In one embodiment, in block 620, transmission of multiple video feeds using multiple cameras from a first electronic device to a second electronic device is controlled (e.g., the multiple video feeds are selectable for sharing transmission). In one embodiment, in block 630, transmission of multiple video feeds using multiple cameras from the second electronic device to the first electronic device is controlled (e.g., the multiple video feeds are selectable for sharing transmission).

Figure 7:
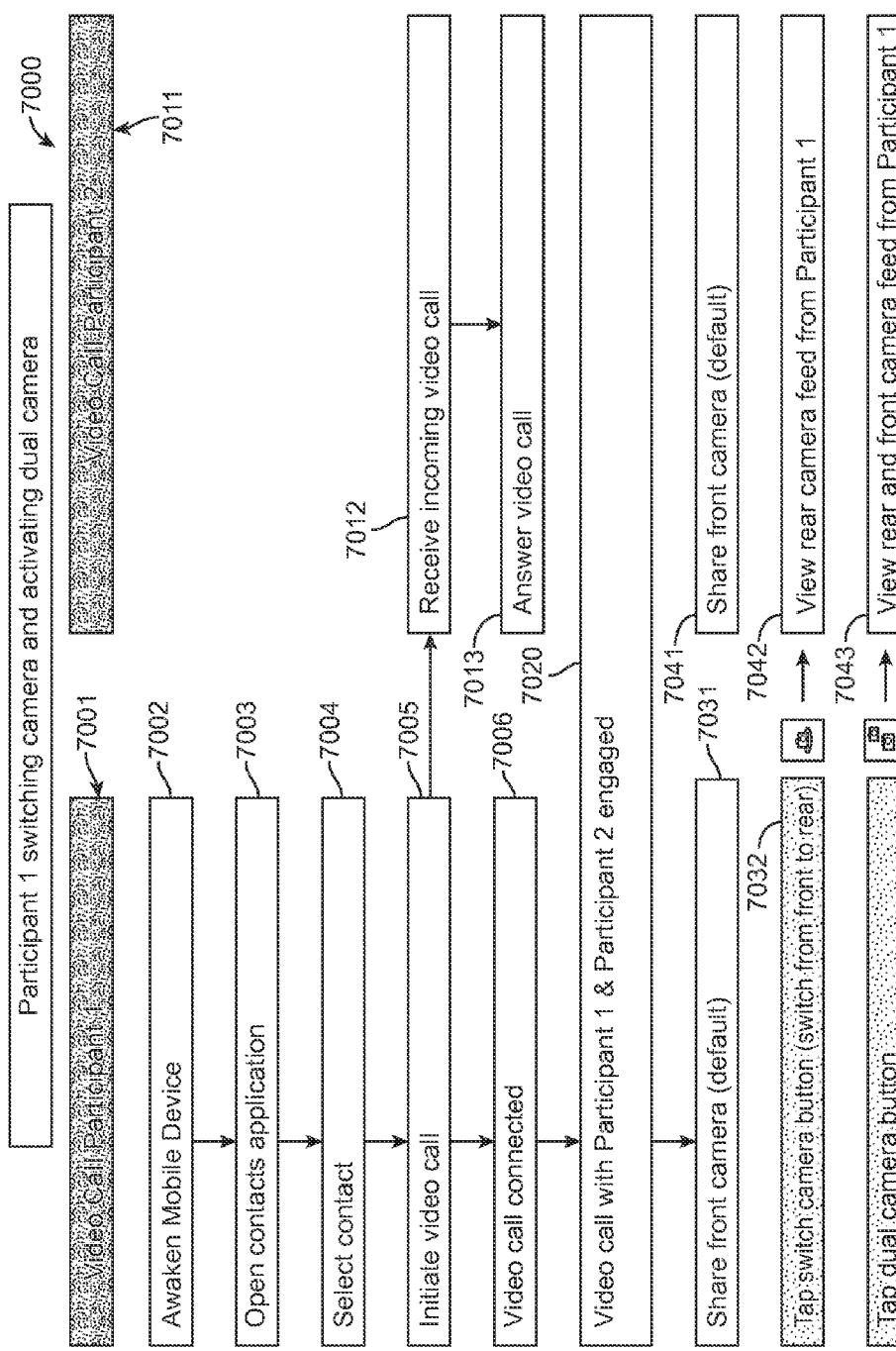
FIG. 7 shows a block diagram of a flowchart for video image sharing and control for an electronic device, according to an example embodiment.

FIG. 7 shows a block diagram of a flowchart 7000 for video image sharing and control for an electronic device 120, according to an example embodiment. In one example embodiment, flowchart 7000 represents the flow for a first video call/chat participant 7001 switching a camera feed and activating dual camera feeds. In this example embodiment, the first video call/chat participant 7001 desires to communicate with a second video call/chat participant 7011.

In one embodiment, in order for the first video call/chat participant 7001 to begin communication, the electronic device 120 of the first video call/chat participant 7001 is awakened in block 7002. In block 7003, the first video call/chat participant 7001 opens a contacts application in order to select the second video call/chat participant 7011. In block 7004, the first video call/chat participant 7001 selects the particular entry in the contact application to be the second video call/chat participant 7011. In one embodiment, in block 7005, the first video call/chat participant 7001 initiates a video call/chat session on their electronic device 120. In one embodiment, in block 7012, the second video call/chat participant 7011 receives the incoming video call/chat on their electronic device 120.

In one embodiment, in block 7006, the video call/chat is connected, and in block 7013, the second video call/chat participant 7011 answers the video call/chat. In one embodiment, in block 7020, the video call/chat session is engaged by the first video call/chat participant 7001 and the second video call/chat participant 7011.

In one embodiment, in block 7031, the first video call/chat participant's electronic device 120 shares the front camera stream with the second video call/chat participant 7011, and in block 7041, the second video call/chat participant 7011 shares the front video stream with the first video call/chat participant 7001, which is the default viewing selection for each electronic device 120. In one embodiment, in block 7032, the first video call/chat participant 7001 taps a camera switch icon on the display 121 of the electronic device 120, which causes (in block 7042) the second video call/chat participant 7011 to view the rear camera feed from the electronic device 120 of the first video call/chat participant 7001. In one embodiment, in block 7033, the first video call/chat participant 7001 taps a dual camera icon on the display 121 of the electronic device 120, which causes (in block 7043) the second video call/chat participant 7011 to view the rear and front video feeds from the first video call/chat participant 7001 on the display 121 of the electronic device 120 of the second video call/chat participant 7011.

Figure 8:
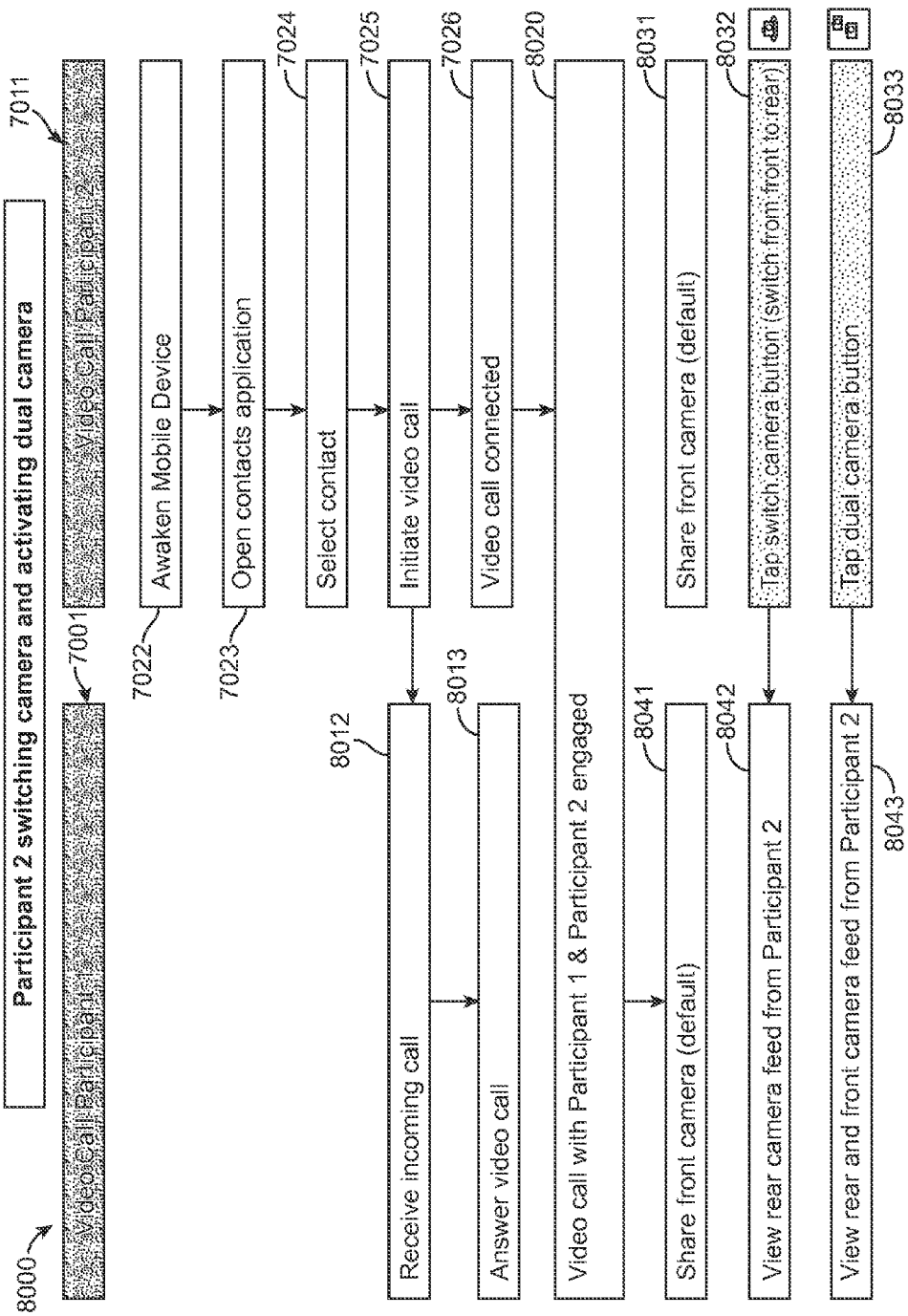
FIG. 8 shows a block diagram of a flowchart for video image sharing and control for an electronic device, according to another example embodiment.

FIG. 8 shows a block diagram of a flowchart 8000 for video image sharing and control for an electronic device 120, according to an example embodiment. In one example embodiment, flowchart 8000 represents the flow for a second video call/chat participant 7011 switching a camera feed and activating dual camera feeds. In this example embodiment, the second video call/chat participant 7011 desires to communicate with a first video call/chat participant 7001.

In one embodiment, in order for the second video call/chat participant 7011 to begin communication, the electronic device 120 of the second video call/chat participant 7011 is awakened in block 7022. In block 7023, the second video call/chat participant 7011 opens a contacts application in order to select the first video call/chat participant 7001. In block 7024, the second video call/chat participant 7011 selects the particular entry in the contact application to be the first video call/chat participant 7001. In one embodiment, in block 7025, the second video call/chat participant 7011 initiates a video call/chat session on their electronic device 120. In one embodiment, in block 8012, the first video call/chat participant 7001 receives the incoming video call/chat on their electronic device 120.

In one embodiment, in block 7026, the video call/chat is connected, and in block 8013, the first video call/chat participant 7001 answers the video call/chat. In one embodiment, in block 8020, the video call/chat session is engaged by the second video call/chat participant 7011 and the first video call/chat participant 7001.

In one embodiment, in block 8031, the second video call/chat participant's electronic device 120 shares the front camera stream with the first video call/chat participant 7001, and in block 8041, the first video call/chat participant 7001 shares the front video stream with the second video call/chat participant 7011, which is the default viewing selection for each electronic device 120. In one embodiment, in block 8032, the second video call/chat participant 7011 taps a camera switch icon on the display 121 of the electronic device 120, which causes (in block 8042) the first video call/chat participant 7001 to view the rear camera feed from the electronic device 120 of the second video call/chat participant 7011. In one embodiment, in block 8033, the second video call/chat participant 7011 taps a dual camera icon on the display 121 of the electronic device 120, which causes (in block 8043) the first video call/chat participant 7001 to view the rear and front video feeds from the second video call/chat participant 7011 on the display 121 of the electronic device 120 of the first video call/chat participant 7001.

Figure 9:
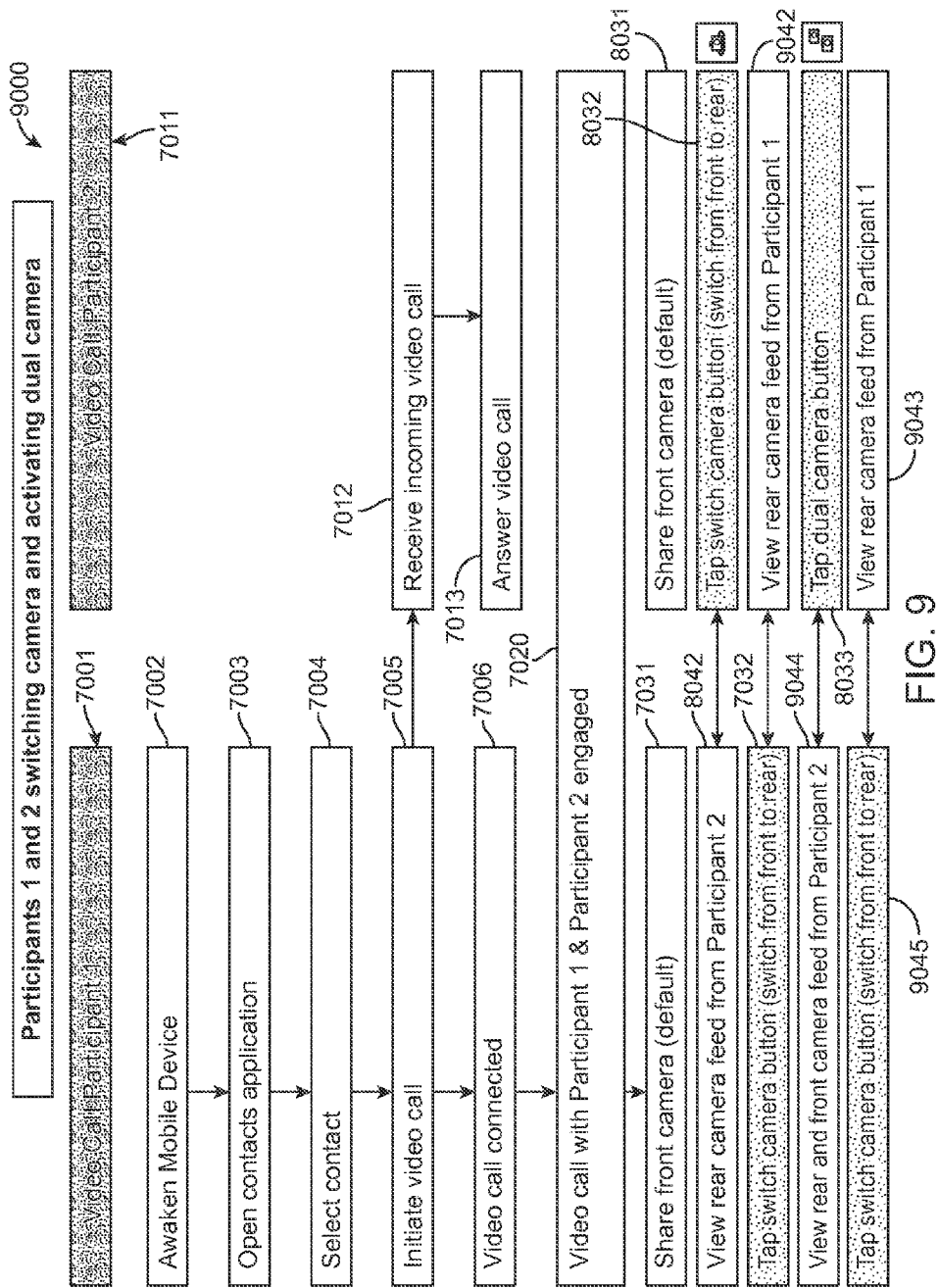
FIG. 9 shows a block diagram of a flowchart for video image sharing and control for an electronic device, according to an example embodiment.

FIG. 9 shows a block diagram of a flowchart 9000 for video image sharing and control for an electronic device 120, according to an example embodiment. In one example embodiment, flowchart 9000 represents the flow for a first video call/chat participant 7001 and a second video call/chat participant 7011 switching camera feeds and activating dual camera feeds. In this example embodiment, the first video call/chat participant 7001 desires to communicate with a second video call/chat participant 7011.

In one embodiment, in order for the first video call/chat participant 7001 to begin communication, the electronic device 120 of the first video call/chat participant 7001 is awakened in block 7002. In block 7003, the first video call/chat participant 7001 opens a contacts application in order to select the second video call/chat participant 7011. In block 7004, the first video call/chat participant 7001 selects the particular entry in the contact application to be the second video call/chat participant 7011. In one embodiment, in block 7005, the first video call/chat participant 7001 initiates a video call/chat session on their electronic device 120. In one embodiment, in block 7012, the second video call/chat participant 7011 receives the incoming video call/chat on their electronic device 120.

In one embodiment, in block 7006, the video call/chat is connected, and in block 7013, the second video call/chat participant 7011 answers the video call/chat. In one embodiment, in block 7020, the video call/chat session is engaged by the first video call/chat participant 7001 and the second video call/chat participant 7011.

In one embodiment, in block 7031, the first video call/chat participant's electronic device 120 shares the front camera stream with the second video call/chat participant 7011, and the second video call/chat participant 7011 shares the front video stream with the first video call/chat participant 7001, which is the default viewing selection for each electronic device 120 in block 8031. In one embodiment, in block 8031, the second video call/chat participant 7011 desires to have the first call/chat participant view the rear camera feed from the second video call/chat participant 7011. In block 8032, the second video call/chat participant 7011 taps a camera switch icon on the display 121 of the electronic device 120, which causes (in block 8042) the first video call/chat participant 7001 to view the rear camera feed from the electronic device 120 of the second video call/chat participant 7011. In block 7032, the first video call/chat participant 7001 taps a camera switch icon on the display 121 of the electronic device 120, which causes (in block 9042) the second video call/chat participant 7011 to view the rear camera feed from the electronic device 120 of the first video call/chat participant 7001.

In one embodiment, in block 8033, the second video call/chat participant 7011 taps a dual camera icon on the display 121 of the electronic device 120, which causes (in block 9044) the first video call/chat participant 7001 to view the rear and front video feeds from the second video call/chat participant 7011 on the display 121 of the electronic device 120 of the first video call/chat participant 7001. In one embodiment, in block 9045 the first video call/chat participant 7001 taps a dual camera icon on the display 121 of the electronic device 120, which causes (in block 9043) the second video call/chat participant 7011 to view the rear and front video feeds from the first video call/chat participant 7001 on the display 121 of the electronic device 120 of the second video call/chat participant 7011.

Figure 10:
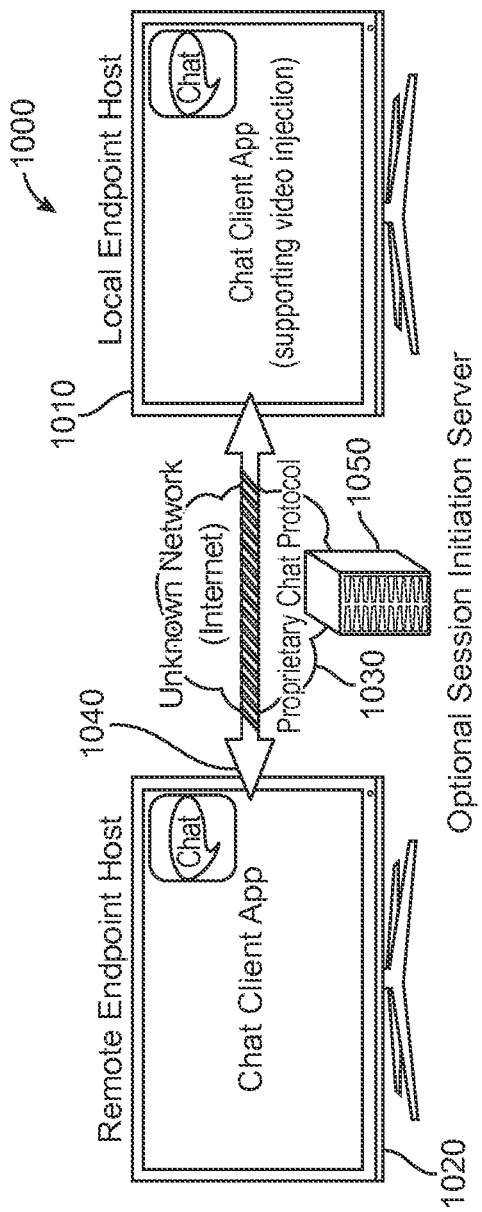
FIG. 10 shows a schematic view of a communications system, according to an embodiment.

FIG. 10 is a schematic view of a communications system in accordance with one embodiment. Communications system 1000 may include a communications device that initiates an outgoing communications operation (local endpoint host device 1010) and a communications network 1030, which local endpoint host device 1010 may use to initiate and conduct video communications operations with other communications devices within communications network 1030, for example using a video chat or video call protocol 1040. For example, communications system 1000 may include a remote endpoint host device 1020 that receives the communications operation from the local endpoint host device 1010. Although communications system 1000 may include several local endpoint host devices 1010 and remote endpoint host devices 1020, only one of each is shown in FIG. 10 to simplify the drawing.

Any suitable circuitry, device, system or combination of these (e.g., a wireless communications infrastructure including communications towers and telecommunications servers) operative to create a communications network may be used to create communications network 1030. Communications network 1030 may be capable of providing communications using any suitable communications protocol. In some embodiments, communications network 1030 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 1030 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. local endpoint host device 110 and remote endpoint host device 1020, when located within communications network 1030, may communicate over a bidirectional communication path such as path 1040. Both local endpoint host device 1010 and remote endpoint host device 1020 may be capable of initiating a communications operation and receiving an initiated communications operation.

In one embodiment, local endpoint host device 1010 and remote endpoint host device 1020 may include any suitable device for sending and receiving communications operations. For example, local endpoint host device 1010 and remote endpoint host device 1020 may include devices such as a television device, a media player, a cellular telephone or a landline telephone, a personal e-mail or messaging device with audio and/or video capabilities, wearable devices, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences). In one embodiment, an optional session initiating server 1050 may be implemented for initiating a video chat or video call application on either local endpoint host device 1010 or remote endpoint host device 1020.

The remote endpoint host device 1020 and local endpoint host device 1010 may run a typical chat client (e.g., such as Skype, XMPP (Jabber), MSN, etc.) compatible with some embodiments that may inject a video stream into a video chat or call channel during a session. The video communication between remote endpoint host device 1020 and local endpoint host device 1010 may provide access to the same video chat system and possessing compatible features are able to establish, through pre-existing means, a video-chat call where at least one of the local endpoint host device 1010 or the remote endpoint host device 1020 possesses and is able to stream video from one or more attached (or associated) camera devices. The video-chat call, between these devices may be facilitated with the help of a session initiation or SIP server 1050 and the connection between these devices travels through a network 1030, such as the internet or a local LAN. The protocol used between these two devices may be proprietary and specific to the utilized video chat system.

Figure 11:
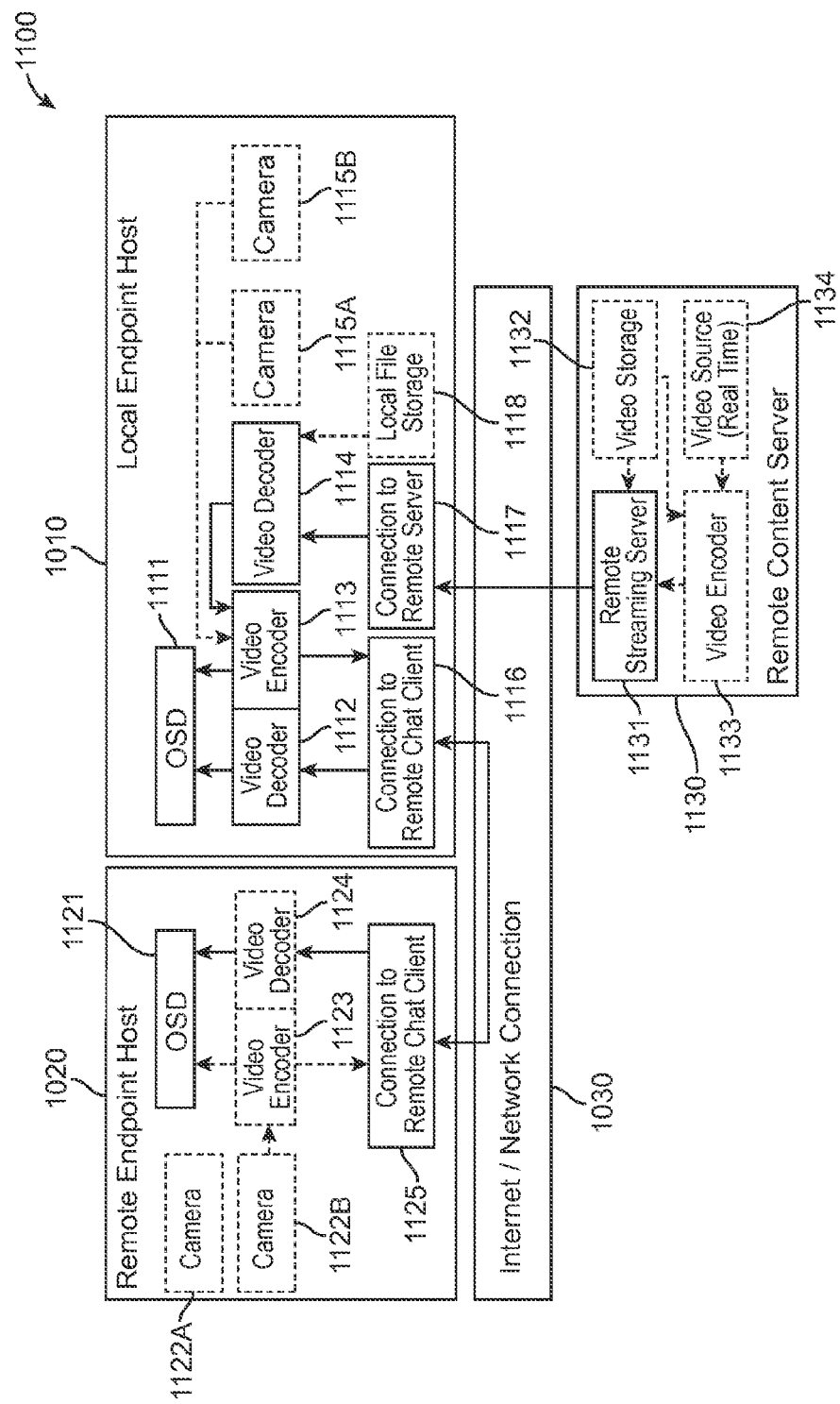
FIG. 11 shows a block diagram of an architecture system for video communication, according to an embodiment.

FIG. 11 shows a functional block diagram of an embodiment of an architecture system 1100 for video communication by the remote endpoint host device 1020 and local endpoint host device 1010, according to an embodiment. In one embodiment, the system 1100 comprises a local endpoint host device 1010 (e.g., for a first video call/chat participant), remote endpoint host device 1020 (e.g., for a second video call/chat participant), an optional remote server device 1130, and network 1030. In one embodiment, the local endpoint host device 1010 comprises a display 1111 (e.g., an on screen display (OSD)), a video decoder 1112, one or more video encoders 1113, an optional video decoder 1114, camera devices 1115A and 1115B, a remote client connection module 1116, an optional remote server connection module 1117 and a local file storage module 1118 (which may be optional in one embodiment).

In one embodiment, the remote endpoint host device 1020 comprises a display 1121 (e.g., an OSD), a camera device 1122A, a camera device 1122B, one or more video encoders 1123, one or more video decoders 1124 and a remote client connection module 1125. In one embodiment, the remote server device 1130 comprises a remote streaming server module 1131, a video storage module 1132, a video encoder 1133 and a video source module 1134.

In one embodiment, the displays 1111 and 1121 may each be a separate device from the local endpoint host device 1010 and the remote endpoint host device 1020, respectively, or integrated with the local endpoint host device 1010 and the remote endpoint host device 1020, respectively. In one embodiment, the network 1030 may comprise a network interface, such as a network modem, router, etc. for handling communications between the local endpoint host device 1010 and the remote endpoint host device 1020 and for forming a local network with which the local endpoint host device 1010 and the remote endpoint host device 1020 may be connected.

In one embodiment, the local endpoint host device 1010 has the ability to switch out-going video from the cameras 1115A and 1115B. In one embodiment, the video encoder 1113 encodes streaming video per the chat protocol specification employed. In one embodiment, the video encoder 1113 has the ability to switch inputs from multiple sources, such as from the camera devices 1115A and 1115B, or from the video decoder 1114 used to transcode streaming video from a source, such as the remote streaming server module 1131, the local file storage module 1118, or any other appropriate external source. In one embodiment, the video encoder 1113 may multiplex video for local playback (if supported). In some embodiments, the video encoder 1113 may directly provide transcoding features for video to directly encode streamed/file content for the outgoing video stream.

In one embodiment, the video decoder 1112 processes video transmitted from the network 1030 and for displaying video content locally on the display 1111. In one embodiment, the video decoder 1114 processes video content transmitted from the network 1030 and for decoding video content to a format compatible with the outgoing encoder 1113 for the video chat or call streams. In one embodiment, the camera devices 1115A and 1115B may be either connected cameras or remote proxies.

In one embodiment, the remote client connection module 1116 follows protocols specified by the specific chat system being used. In one embodiment, the remote client connection module 1116 may either be supplied by the system or used via an external API. In one embodiment, the local file storage module 1118 may be optional or required if the system 1100 supports video injection from a local file source. In one embodiment, the local file storage module 1118 supports the codecs of the supported video formats available to it. In one embodiment, the remote server connection module 1117 represents a client of one or more supported services of streaming content available either from known providers (e.g., YOUTUBE®, HULU®), from specific streaming source protocols (e.g., RTSP, RTP, RTMP, HLS, etc), or from locally available video sources (e.g., Tuner, Video Input, etc.).

In one embodiment, the video encoder 1123 encodes streaming video per the chat protocol specification. In one embodiment, the video encoder 1123 may multiplex the video for local playback if supported. In one embodiment, the video decoder 1124 processes video transmitted from the network 1030 and displays video content locally on the display 1121. In one embodiment, the camera devices 1122A and 1122B may be either connected cameras or remote proxies. In one embodiment, the remote client connection module 1125 follows protocols specified by the specific chat system being used. In one embodiment, the remote client connection module 1125 may either be supplied by the system or used via an external API.

In one embodiment, the remote streaming server module 1131 provides functionality to serve and stream content via network or web services to clients on the Internet. In one embodiment, the video encoder 1133 may be optional. In one embodiment, if the system 1100 provides transcoding or encoding to specific formats, the video encoder 1133 may be present for these purposes. In one embodiment, the video storage module 1132 is optional. In one embodiment, the video storage module 1132 may be present either to serve pre-encoded files or to feed files to a video encoder 1133 for encoding, re-encoding or transcoding. In one embodiment, the video source module 1134 may provide real-time video sources, such as webcams, video feeds (TV), queued content (program content), other live content, etc.

In one embodiment, both the local endpoint host device 1010 and the remote endpoint host device 1020 may include an input mechanism, communications circuitry, control circuitry, a global positioning system (GPS) receiver module, a microphone, audio output, and any other suitable components. In one embodiment, all of the applications employed by the displays 1111 and 1121, the input mechanism, the audio output and communications circuitry may be interconnected and managed by control circuitry.

In one embodiment, the audio output may include any suitable audio component for providing audio to a user of the local endpoint host device 1010 or the remote endpoint host device 1020. For example, the audio output may include one or more speakers (e.g., mono or stereo speakers) built into the local endpoint host device 1010 or the remote endpoint host device 1020. In some embodiments, the audio output may include an audio component that is remotely coupled to the local endpoint host device 1010 or the remote endpoint host device 1020. For example, the audio output may include a headset, headphones or earbuds that may be coupled to a communications device with a wire (e.g., coupled to the local endpoint host device 1010 or the remote endpoint host device 1020 with a jack) or wirelessly (e.g., Bluetooth® headphones or a Bluetooth® headset).

In one embodiment, the displays 1111/1121 may include any suitable screen or projection system for providing a display visible to the user. For example, the display 1111/1121 may include a screen (e.g., an LCD screen) that is incorporated in the local endpoint host device 1010 or the remote endpoint host device 1020. As another example, the display 1111/1121 may include a movable display or a projecting system for providing a display of content on a surface remote from the local endpoint host device 1010 or the remote endpoint host device 1020 (e.g., a video projector). The display 1111/1121 may be operative to display content (e.g., information regarding communications operations or information regarding available media selections) under the direction of the control circuitry.

In one embodiment, the input mechanism may be any suitable mechanism or user interface for providing user inputs or instructions to the local endpoint host device 1010 or the remote endpoint host device 1020. The input mechanism may take a variety of forms, such as a button, keypad, dial, a click wheel, or a touch screen. The input mechanism may include a multi-touch screen. The input mechanism may include a user interface that may emulate a rotary phone or a multi-button keypad, which may be implemented on a touch screen or the combination of a click wheel or other user input device and a screen.

In one embodiment, the communications circuitry may be any suitable communications circuitry operative to connect to a communications network (e.g., network 1030, FIG. 10) and to transmit communications operations and media from the local endpoint host device 1010 or the remote endpoint host device 1020. The communications circuitry may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quad-band, and other cellular protocols, VOIP, or any other suitable protocol.

In some embodiments, the communications circuitry may be operative to create a communications network using any suitable communications protocol. For example, the communications circuitry may create a short-range communications network using a short-range communications protocol to connect to other communications devices. For example, the communications circuitry may be operative to create a local communications network using the Bluetooth® protocol to couple the local endpoint host device 1010 or the remote endpoint host device 1020 with a Bluetooth® headset.

In one embodiment, the control circuitry may be operative to control the operations and performance of the local endpoint host device 1010 or the remote endpoint host device 1020. The control circuitry may include, for example, a processor, a bus (e.g., for sending instructions to the other components of the local endpoint host device 1010 and the remote endpoint host device 1020), memory, storage, or any other suitable component for controlling the operations of the local endpoint host device 1010 or the remote endpoint host device 1020. In some embodiments, a processor may drive the display 1111/1121 and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the local endpoint host device 1010 or the remote endpoint host device 1020 performs communications operations (e.g., saving contact information related to communications operations or storing information related to different media types and media items selected by the user).

In one embodiment, the control circuitry may be operative to perform the operations of one or more applications implemented on the local endpoint host device 1010 and the remote endpoint host device 1020. Any suitable number or type of applications may be implemented. Although the following discussion will enumerate different applications, it will be understood that some or all of the applications may be combined into one or more applications. For example, the local endpoint host device 1010 and the remote endpoint host device 1020 may include an application connection application, a video chat application, a video call application, a map application, a media application (e.g., QuickTime, Mobile-Music.app, or MobileVideo.app). In some embodiments, the local endpoint host device 1010 or the remote endpoint host device 1020 may include one or several applications operative to perform communications operations. For example, the local endpoint host device 1010 and the remote endpoint host device 1020 may include a messaging application, a mail application, a telephone application, a voicemail application, an instant messaging application (e.g., for chatting), a video-conferencing application, a fax application, or any other suitable application for performing any suitable communications operation.

In some embodiments, the local endpoint host device 1010 and the remote endpoint host device 1020 may include a microphone. For example, the local endpoint host device 1010 and the remote endpoint host device 1020 may include a microphone to allow the user to transmit audio (e.g., voice audio) during a communications operation or as a means of establishing a communications operation or as an alternate to using a physical user interface. A microphone may be incorporated in the local endpoint host device 1010 and the remote endpoint host device 1020, or may be remotely coupled to the local endpoint host device 1010 or the remote endpoint host device 1020. For example, a microphone may be incorporated in wired headphones, or a microphone may be incorporated in a wireless headset.

In one embodiment, the local endpoint host device 1010 and the remote endpoint host device 1020 may include any other component suitable for performing a communications operation. For example, the local endpoint host device 1010 and the remote endpoint host device 1020 may include a power supply, ports, or interfaces for coupling to a host device, a secondary input mechanism (e.g., an ON/OFF switch), or any other suitable component.

In one embodiment, a user may direct the local endpoint host device 1010 or the remote endpoint host device 1020 to perform a communications operation using any suitable approach. As one example, a user may receive a communications request from another device (e.g., an incoming telephone call, an incoming video chat session, a video call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, the local endpoint host device 1010 or the remote endpoint host device 1020 may comprise a mobile device that may utilize mobile device hardware functionality including: a GPS receiver module, cameras 1115A-1115B/1122A-1122B, a compass module, and an accelerometer and gyroscope module. A GPS receiver module may be used to identify a current location of the mobile device (i.e., user). The compass module is used to identify direction of the mobile device. The accelerometer and gyroscope module is used to identify tilt of the mobile device.

Figure 12:
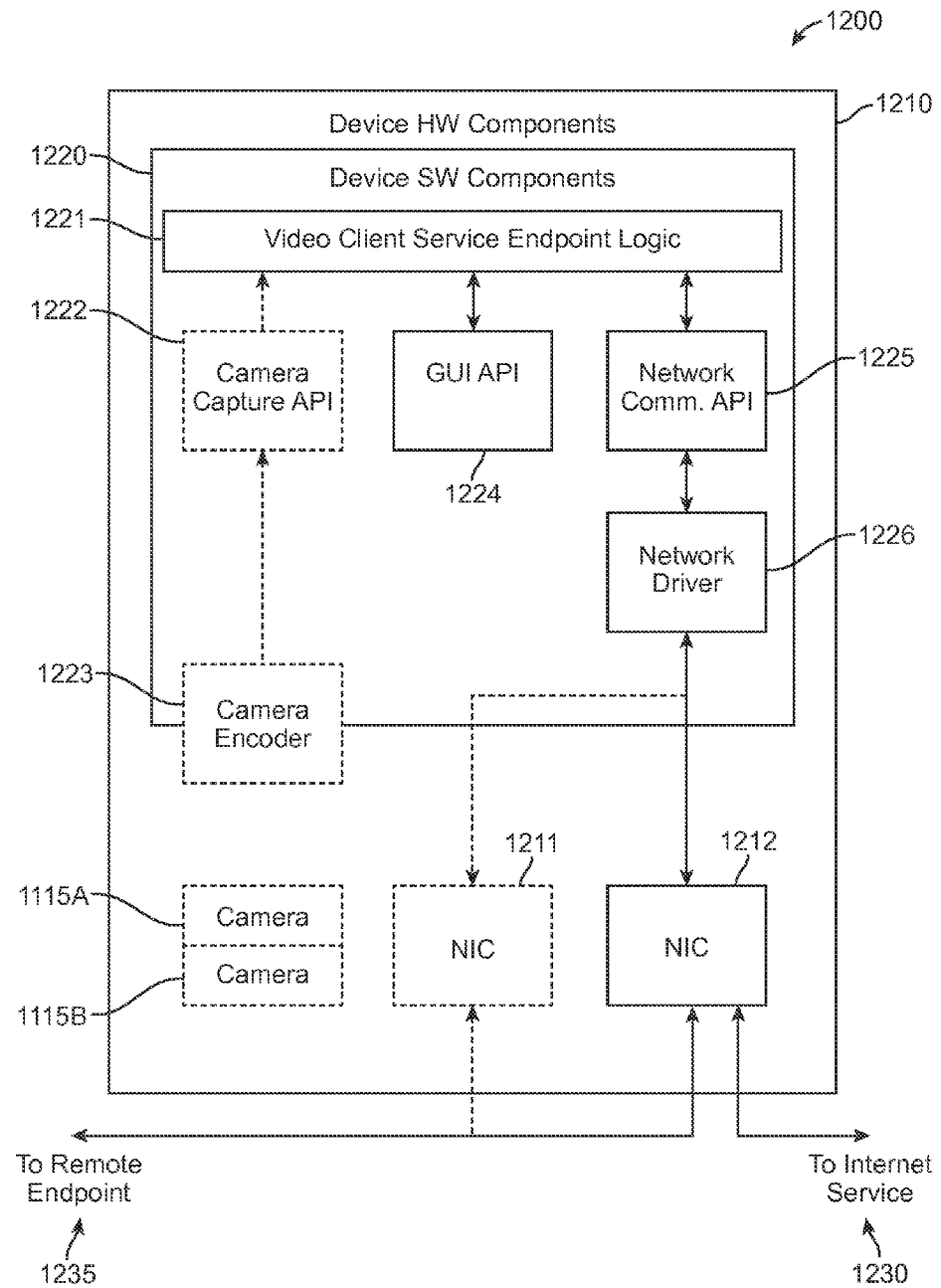
FIG. 12 shows a block diagram of an architecture for a local endpoint host, according to an example embodiment.

FIG. 12 shows an architecture for a local endpoint host 1200, according to an embodiment. In one embodiment, the local endpoint host 1200 comprises a hardware (HW) portion 1210 and a software (SW) portion 1220. In one embodiment, the HW portion 1210 comprises the cameras 1115A and 1115B, network interface (NIC) 1211 (optional) and NIC 1212 and a portion of the camera encoder 1223 (optional). In one embodiment, the SW portion 1220 comprises video client service endpoint logic 1221, camera capture API 1222 (optional), a graphical user interface (GUI) API 1224, network communication API 1225 and network driver 1226. In one embodiment, the content flow (e.g., video and/or audio content, reference content (e.g., a link)) flows to the remote endpoint in the direction of the flow 1235, and communication of external links, video and/or audio sources, etc. flow to a network service (e.g., Internet service) in the direction of flow 1230.

One or more embodiments use features of WebRTC for acquiring and communicating streaming data. In one embodiment, the use of WebRTC implements one or more of the following APIs: MediaStream (e.g., to get access to data streams, such as from the user's camera and microphone), RTCPeerConnection (e.g., audio or video calling, with facilities for encryption and bandwidth management), RTCDataChannel (e.g., for peer-to-peer communication of generic data), etc.

In one embodiment, the MediaStream API represents synchronized streams of media. For example, a stream taken from camera and microphone input may have synchronized video and audio tracks. One or more embodiments may implement an RTCPeerConnection API to communicate streaming data between browsers (e.g., peers), but also use signaling (e.g., messaging protocol, such as SIP or XMPP, and any appropriate duplex (two-way) communication channel) to coordinate communication and to send control messages. In one embodiment, signaling is used to exchange three types of information: session control messages (e.g., to initialize or close communication and report errors), network configuration (e.g., a computer's IP address and port information), and media capabilities (e.g., what codecs and resolutions may be handled by the browser and the browser it wants to communicate with).

In one embodiment, the RTCPeerConnection API is the WebRTC component that handles stable and efficient communication of streaming data between peers. In one embodiment, an implementation establishes a channel for communication using an API, such as by the following processes: client A generates a unique ID, Client A requests a Channel token from the App Engine app, passing its ID, App Engine app requests a channel and a token for the client's ID from the Channel API, App sends the token to Client A, Client A opens a socket and listens on the channel set up on the server. In one embodiment, an implementation sends a message by the following processes: Client B makes a POST request to the App Engine app with an update, the App Engine app passes a request to the channel, the channel carries a message to Client A, and Client A's on message callback is called.

In one embodiment, WebRTC may be implemented for a one-to-one communication, or with multiple peers each communicating with each other directly, peer-to-peer, or via a centralized server. In one embodiment, Gateway servers may enable a WebRTC app running on a browser to interact with electronic devices.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for video image sharing and control, comprising:

activating, by a first electronic device, video chat communication;

decoding, by a first decoder, a first video feed from a first camera and a second video feed from a second camera;

decoding, by a second decoder, a video stream from a remote source or a local file storage device; and controlling transmission and display of at least two of the first video feed, the second video feed and the video stream.

2. The method of claim 1, wherein controlling comprises selectively controlling transmission for the first video feed using the first camera of the first electronic device, and for the second video feed using the second camera of the first electronic device.

3. The method of claim 2, further comprising:

controlling, by the first electronic device, reception of a plurality of video feeds received from a plurality of cameras of a second electronic device.

4. The method of claim 1, wherein the first electronic device selects between a third video feed and a fourth video feed to be displayed in a full-screen view on the first electronic device.

5. The method of claim 1, wherein the first camera is a front camera and the second camera is a rear camera.

6. The method of claim 5, further comprising controlling, by the first electronic device, transmission of the first video feed or the second video feed based on receiving input from a multi-touch screen of a display of the first electronic device over a first display portion including a video feed image of the first video feed or over a second display portion of the second video feed to turn on sharing or turn off sharing.

7. The method of claim 1, wherein the first electronic device is a mobile phone.

8. The method of claim 1, wherein controlling comprises: controlling transmission of a first one of the plurality of video feeds, controlling transmission of a second one of the plurality of video feeds, or controlling transmission of both the first one and the second one of the plurality of video feeds.

9. The method of claim 1, wherein the multichannel video chat communication uses Web real-time communication (WebRTC) features for acquiring and communicating streaming data.

10. An apparatus comprising:

a first camera configured to capture a first video feed;

a second camera configured to capture a second video feed;

a first decoder configured to decode the first video feed from the first camera and the second video feed from the second camera;

a second decoder configured to decode a video stream from a remote source or a local file storage device; and a processor configured to control chat video transmission and display of at least two of the first video feed, the second video feed and the video stream.

11. The apparatus of claim 10, wherein the processor is configured to selectively control transmission for the first video feed and the second video feed.

12. The apparatus of claim 11, wherein the apparatus is a mobile phone.

13. The apparatus of claim 11, wherein the processor is further configured to select between a third video feed and a fourth video feed to be displayed in a full-screen view on a first screen view of a display, and to display the first video feed or the second video feed in a full-screen view on a second screen view of the display.

14. The apparatus of claim 13, wherein the first camera is a front camera and the second camera is a rear camera.

15. The apparatus of claim 14, wherein the processor is configured to control the first video feed transmission and the second video feed transmission based on receiving input from a multi-touch screen of the display over a first display portion including video feed image of the first video feed or over a second display portion of the second video feed to turn on sharing or turn off sharing of the first video feed or the second video feed.

16. The apparatus of claim 15, wherein the first video feed and the second video feed are simultaneously transmitted from the apparatus while the third video feed and the fourth video feed are simultaneously received by the apparatus.

17. The apparatus of claim 10, further comprising:

an encoder configured to switch inputs from the first camera and the second camera, from the second decoder, and from the local file storage device.

18. A non-transitory computer-readable storage medium embodied thereon instructions being executable by at least one processor to perform a method for video image sharing and control, the method comprising:

activating, by a first electronic device, video chat communication;

decoding, by a first decoder, a first video feed from a first camera and a second video feed from a second camera;

decoding, by a second decoder, a video stream from a remote source or a local file storage device; and controlling transmission and display of at least two or the first video feed, the second video feed and the video stream.

19. The non-transitory computer-readable storage medium of claim 18, wherein controlling comprises selectively controlling transmission for the first video feed using the first camera of the first electronic device, and for a second video feed using a second camera of the first electronic device.

20. The non-transitory computer-readable storage medium of claim 19, further comprising:

controlling, by the first electronic device, reception of a plurality of video feeds received from a plurality of cameras of a second electronic device.

21. The non-transitory computer-readable storage medium of claim 18, further comprising controlling, by the first electronic device, transmission of the first video feed or the second video feed based on receiving input from a multi-touch screen of a display of the first electronic device over a first display portion including a video feed image of the first video feed or over a second display portion of the second video feed to turn on sharing or turn off sharing.

22. The non-transitory computer-readable storage medium of claim 18, wherein the first electronic device is a mobile phone.

23. The medium of claim 18, wherein controlling comprises: controlling transmission of a first one of the plurality of video feeds, controlling transmission of a second one of the plurality of video feeds, or controlling transmission of both the first one and the second one of the plurality of video feeds.

24. A method for displaying a graphical user interface (GUI) on a display of an electronic device, the method comprising:

activating, by a first electronic device, a video chat communication;

decoding, by a first decoder, a first video feed captured from a first camera and a second video feed from a second camera;

decoding, by a second decoder, a video stream from a remote source or a local file storage device;

displaying images from at least two of the first video feed, the second video feed and the video stream in the GUI on the display; and selectively switching position of the displayed images in the GUI.

25. A server comprising:
a memory for storing video feeds; and
a multichannel chat video service that uses a processor configured to stream video content to share the video feeds between a plurality of electronic devices, wherein the multichannel chat video service uses Web real-time communication (WebRTC) features for acquiring and communicating streaming data, and the service is configured to share a first video feed and a second video feed between the plurality of electronic devices.

26. The server of claim 25, wherein the service is configured to control the first video feed and the second video feed using signals from a first electronic device for transmission to a second electronic device, and a first camera captures the first video feed, and a second camera captures the second video feed.

27. The server of claim 26, wherein the first video feed and the second video feed are communicated over a cloud network, and the server is configured to selectively control transmission to the first electronic device for a third video feed from a third camera and for a fourth video feed from a fourth camera using signals received from the second electronic device.

28. The server of claim 27, wherein the first camera and the third camera each comprise a front camera and the second camera and the fourth camera each comprise a rear camera.

29. The server of claim 28, wherein the server is configured to simultaneously stream the first video feed and the second video feed to a particular one of the plurality of electronic devices to another one of the plurality of electronic devices while the third video feed and the second video feed are simultaneously streamed from the server to the another one of the plurality of electronic devices to the particular one of the plurality of electronic devices.

30. The server of claim 29, wherein each of the plurality of electronic devices is a mobile phone, and the server is part of the cloud network.

31. An electronic device, comprising:
a display including a multi-touch screen;
a memory configured to store a first image of a first video feed captured from a first camera and a second image of a second video feed captured from a second camera;
a first decoder configured to decode the first video feed from the first camera and the second video feed from the second camera;
a second decoder configured to decode a video stream from a remote source or a local file storage device; and
a processor configured to
simultaneously display images from at least two of the first video feed, the second video feed and the video stream in a graphical user interface (GUI) on the display, wherein the GUI is configured to control display of the images in a video chat communication.

32. The electronic device of claim 31, wherein the processor is further configured to control a third video feed captured from a third camera and a fourth video feed captured from a fourth camera, and the third video feed and the fourth video feed are transmitted from the electronic device.

* * * * *